United States Patent [19]
Deker

[11] Patent Number: 6,161,063
[45] Date of Patent: Dec. 12, 2000

[54] METHOD FOR CONTROLLING AN AERODYNE FOR THE VERTICAL AVOIDANCE OF A ZONE

[75] Inventor: Guy Deker, Chaville, France

[73] Assignee: Sextant Avionique, Velizy Villacoublay, France

[21] Appl. No.: 09/147,354

[22] PCT Filed: Jun. 3, 1997

[86] PCT No.: PCT/FR97/00972

§ 371 Date: Jan. 8, 1999

§ 102(e) Date: Jan. 8, 1999

[87] PCT Pub. No.: WO97/48027

PCT Pub. Date: Dec. 18, 1997

[30] Foreign Application Priority Data

Jun. 7, 1996 [FR] France .................................. 96/07078

[51] Int. Cl.$^7$ .............................. G06F 17/00; G06F 7/00
[52] U.S. Cl. .................................. 701/4; 701/11; 701/14; 701/120; 701/301; 701/302; 244/75 R; 244/180; 244/186
[58] Field of Search ................................. 701/3, 4, 9, 7, 701/11, 13, 14, 15, 16, 120, 200, 201, 226, 300, 301, 302, 10; 244/75 R, 158 R, 180, 186; 340/945, 961

[56] References Cited

U.S. PATENT DOCUMENTS

| | | | |
|---|---|---|---|
| 5,265,024 | 11/1993 | Crabill et al. | 244/186 |
| 5,337,982 | 8/1994 | Sherry | 701/200 |
| 5,416,713 | 5/1995 | Kameda et al. | 701/301 |
| 5,555,175 | 9/1996 | D'orso | 701/301 |
| 5,581,250 | 12/1996 | Khvilivitzky | 701/301 |
| 5,838,262 | 11/1998 | Kershner et al. | 701/301 |
| 5,872,526 | 2/1999 | Tognazzini | 701/301 |

*Primary Examiner*—William A. Cuchlinski, Jr.
*Assistant Examiner*—Gertrude Arthur
*Attorney, Agent, or Firm*—Oblon, Spivak, McClelland, Maier & Neustadt, P.C.

[57] ABSTRACT

A method of automatically controlling an aircraft to avoid a vertical zone includes several steps. The aircraft first acquires limits of the zone to be avoided. The zone is modeled by a cylindrical volume which is limited by a horizontal contour with upper and lower altitudes of the zone. The cylindrical volume associated with a scheduled route of the aircraft is located and points of entry and exit in the cylindrical volume are determined. A new flight altitude is calculated in order to avoid the zone. A point of change of altitude is calculated to reach an avoidance altitude. The new flight altitude is updated and the point of change of altitude is input into an automatic pilot.

20 Claims, 4 Drawing Sheets

METHOD FOR CONTROLLING AN AERODYNE FOR THE VERTICAL AVOIDANCE OF A ZONE

BACKGROUND OF THE INVENTION

1. Field of the Invention

The present invention relates to a method for automatically controlling an aerodyne permitting the vertical avoidance of a zone, for example a dangerous weather zone or one in which there is a risk of the comfort and safety of the flight being affected.

2. Discussion of the Background

It applies in particular, but not exclusively, to the avoidance of an invisible zone, for example one of strong turbulence, such as clear air turbulence, or one in which the risk of icing is considerable. This zone is roughly delimited by a horizontal contour of large dimensions and upper and lower vertical limits. Such information is, for example, received by the aerodyne by way of a digital data transmission device, for example Data-Link, and has been sent by a ground station, possibly based on information transmitted by the neighbouring aerodynes equipped with an ADS (Automatic Dependent Surveillance) system.

Currently, it is up to the pilot to handle the meteorological problem manually, either by carrying out avoidance within sight of the zone, or by taking the risk of traversing the zone, these operations having to take account of a considerable number of parameters, and in particular, of the regulations in force within the air space traversed, of the performance of the aerodyne, and of the weight of fuel in its tanks. Moreover, given that the so-called clear weather meteorological phenomena are by definition invisible, it frequently happens that the pilot is warned of such a phenomenom only a very short time before entering the zone in which this phenomenom is located, and in many cases, this time is insufficient to enable him to take into account all the necessary parameters for determining the best avoidance trajectory.

SUMMARY OF THE INVENTION

The purpose of the present invention is to overcome this drawback and to ease the pilot's task. For this purpose, it proposes a method for automatically controlling an aerodyne for the vertical avoidance of a fixed zone with predefined geometrical contours, the aerodyne being equipped with an automatic piloting device, into which have been input a scheduled route, a cruising flight altitude and the position of the point of descent towards the scheduled runway.

According to the invention, this method is characterized in that it comprises the following steps in succession:

the acquiring of the limits of the zone to be avoided in the form of a horizontal contour and upper and lower altitudes, and the modelling of the zone to be avoided by a cylindrical volume delimited by the horizontal contour and the upper and lower altitudes, the locating of the cylindrical volume with respect to the scheduled route of the aerodyne so as to determine whether this route traverses the cylindrical volume, if the scheduled route traverses the cylindrical volume, the determining of the points of entry and of exit of the scheduled route in the cylindrical volume, the calculating of the optimum and maximum altitudes capable of being reached by the aerodyne, and of the weight of the latter when passing through the point of entry, account being taken of the current weight of the aerodyne, and of its consumption of fuel in order to reach this point, the calculating of a new flight altitude for the vertical avoidance of the zone, and of a point of change of altitude so as to reach the avoidance altitude, as a function of the altitudes of the lower and upper limits of the zone, of the current, maximum and optimum altitudes of the aerodyne, and of the position of the scheduled points of exit from the cylindrical volume and of descent of the aerodyne, and the updating of the new flight altitude, and the inputting of the position of the point of change of altitude into the automatic piloting device.

By virtue of these provisions, the burden of modifying the flight plan and of controlling the aerodyne with a view to avoiding the dangerous zone is completely removed from the pilot.

According to a particular feature of the invention, the avoidance of the zone is performed by flying below when the upper altitude of the zone lies above the maximum altitude capable of being reached by the aerodyne at the point of entry, or else when the scheduled point of descent lies in the cylindrical volume.

According to another particular feature of the invention, the avoidance altitude is preferably equal to the optimum altitude of the aerodyne at the point of entry.

BRIEF DESCRIPTION OF THE DRAWINGS

An embodiment of the method according to the invention will be described hereinafter, by way of a non-limiting example, with reference to the appended drawings in which.

DETAILED DESCRIPTION OF THE PREFERRED EMBODIMENTS

Figure 1:
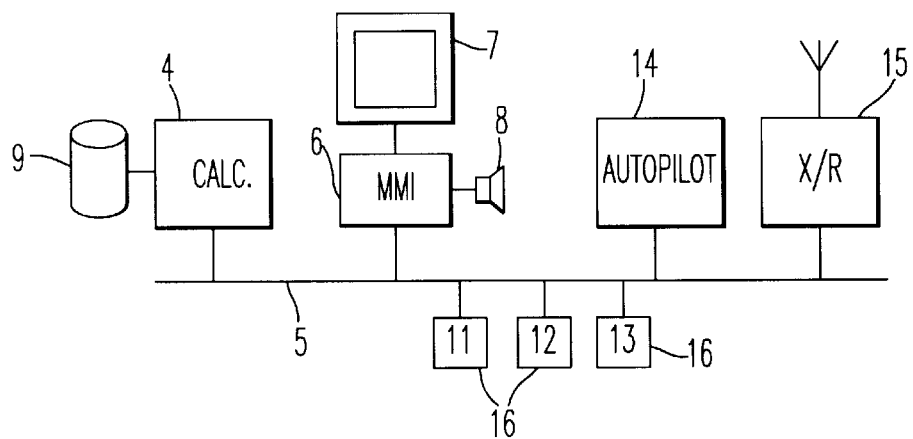
FIG. 1 diagramatically represents the electronic equipment of an aerodyne comprising a computer intended to implement the method according to the invention.

As represented in FIG. 1, the avoidance method according to the invention is particularly designed to be executed by a computer 4 installed on board an aerodyne, which is coupled by way of a data transmission bus 5, called the "aircraft bus", to the navigation equipment which includes an automatic piloting device 14 and navigation instruments 16, to a digital data transmission device 15, for example Data-Link, and also to a man/machine interface device (MMI) 6 comprising a control element and signalling elements, such as a display screen 7 and a loudspeaker 8 which are installed in the cockpit.

In a known manner, the automatic piloting device 14 comprises a memory in which is recorded the aerodyne's scheduled trajectory comprising a lateral trajectory and a vertical profile. The lateral trajectory consists of a route formed of a succession of straight segments between the departure point and the destination point, and of transition trajectories making it possible to join one segment to another. The vertical profile indicates in particular the cruising altitude and the position of the point of descent towards the scheduled runway.

The data transmission device 15, consisting for example of a Data-Link communication system, is capable of receiving meteorological information from a ground station or from aerodynes situated within radio range. This information makes it possible to locate a zone of meteorological activity, for example, in which there is strong turbulence or considerable icing conditions.

Figure 4:
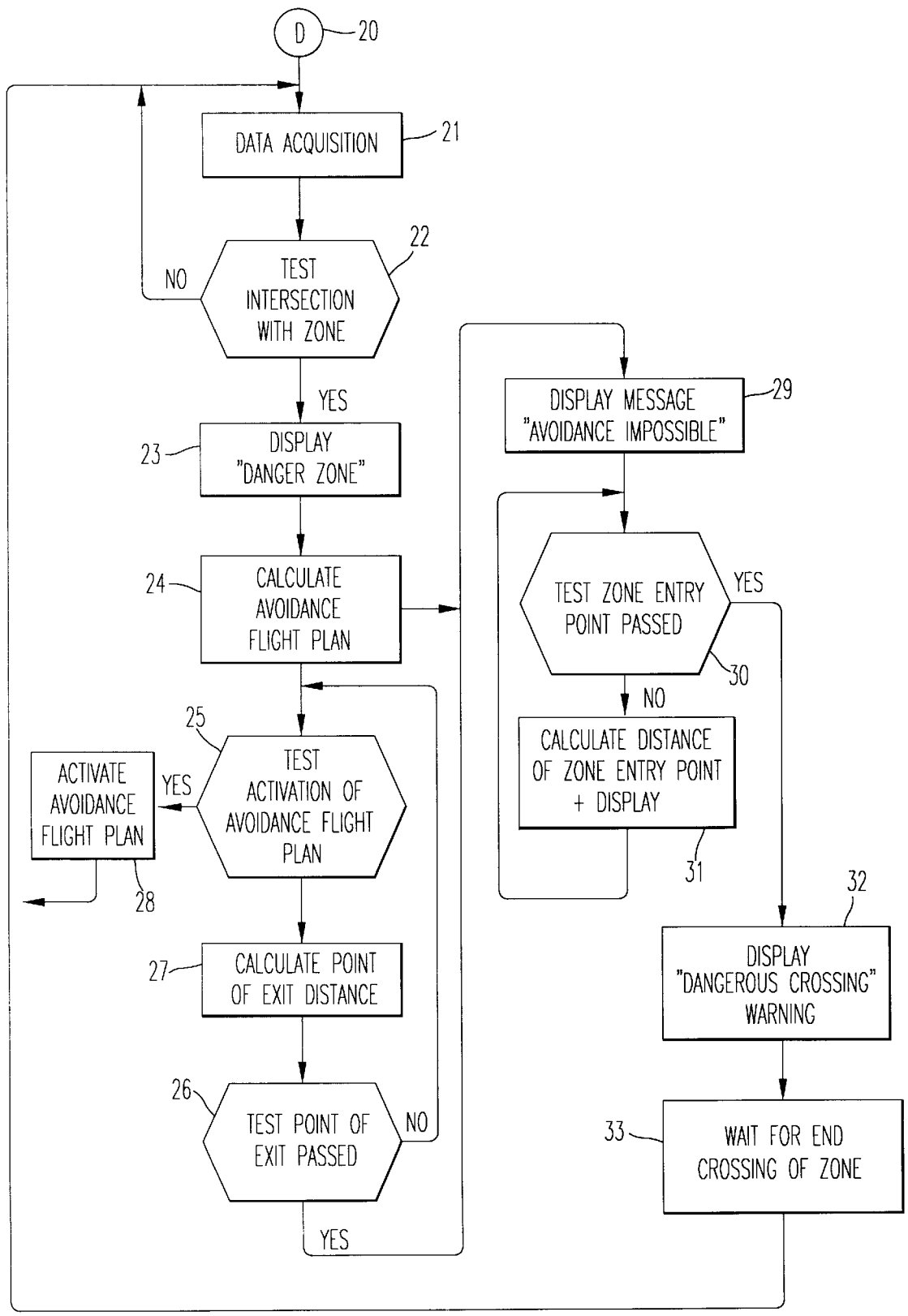
FIGS. 4, 5a and 5b diagramatically illustrate the algorithm executed in order to process the information relating to the limits of a zone to be avoided.

When such information is received, the computer 4 executes the algorithm shown in FIG. 4. This algorithm consists firstly, in step 21, in acquiring the data delivered by the data transmission device 15 and in delimiting a meteorological zone by a cylindrical volume 10 defined by a horizontal contour and lower and upper altitudes (FIG. 2).

Figure 2:
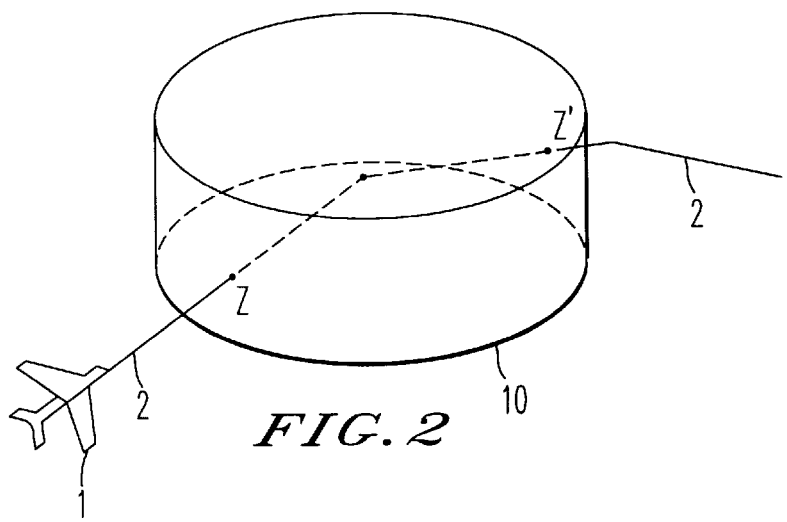
FIG. 2 diagramatically represents in perspective the trajectory of an aerodyne which traverses a cylindrical volume enveloping a zone to be avoided.

In step 22 of FIG. 4, the computer 4 locates the route 2 defined in FIG. 2 by the scheduled flight plan of an aerodyne 1, with respect to the meteorological zone. To do this, the computer 4 accesses the definition of the scheduled flight plan which is for example stored in the automatic piloting device 14.

If the aerodyne 1 is not going to enter the meteorological zone, one returns to the start 20 of the algorithm to continue the analysis of the information supplied by the data transmission device 15. In the contrary case, in step 23 in FIG. 4, the computer 4 sends a message intended for the display screen 7 so as to warn the pilot that the route 2 to be travelled by the aerodyne 1 traverses a zone of meteorological activity. This information can be supplemented by the displaying on the screen 7 of the map of the overflown region, overlaid with the limits of the zone.

Figure 3:
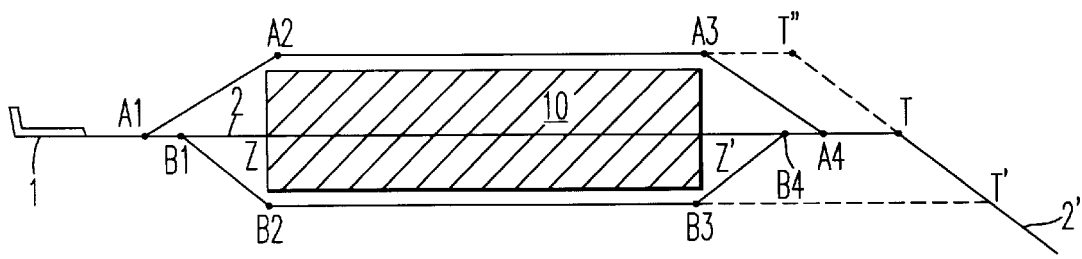
FIG. 3 shows a section through a vertical plane of the initially scheduled trajectory of the aerodyne, and the possible avoidance trajectories, with respect to the cylindrical volume enveloping the zone to be avoided.

It is then required to determine an avoidance trajectory such as A1-A2-A3-A4 which passes above the cylindrical volume 10 or B1-B2-B3-B4 which passes below the cylindrical volume 10, these being shown in FIG. 3. These trajectories are defined by a point of exit A1, B1 from the initially scheduled trajectory, a phase of change of altitude A1-A2, B1-B2 so as to meet up with the avoidance altitude, and a constant altitude phase A2-A3, B2-B3 at the avoidance altitude, and a descent phase of return to the scheduled trajectory A3-A4, B3-B4 and a point of return A4, B4 to the scheduled trajectory.

It should be noted that, in certain cases, this point of return may lie after the initially scheduled point of descent T, the avoidance trajectory meeting up directly with the descent trajectory 2' at the avoidance altitude.

Figure 5A:
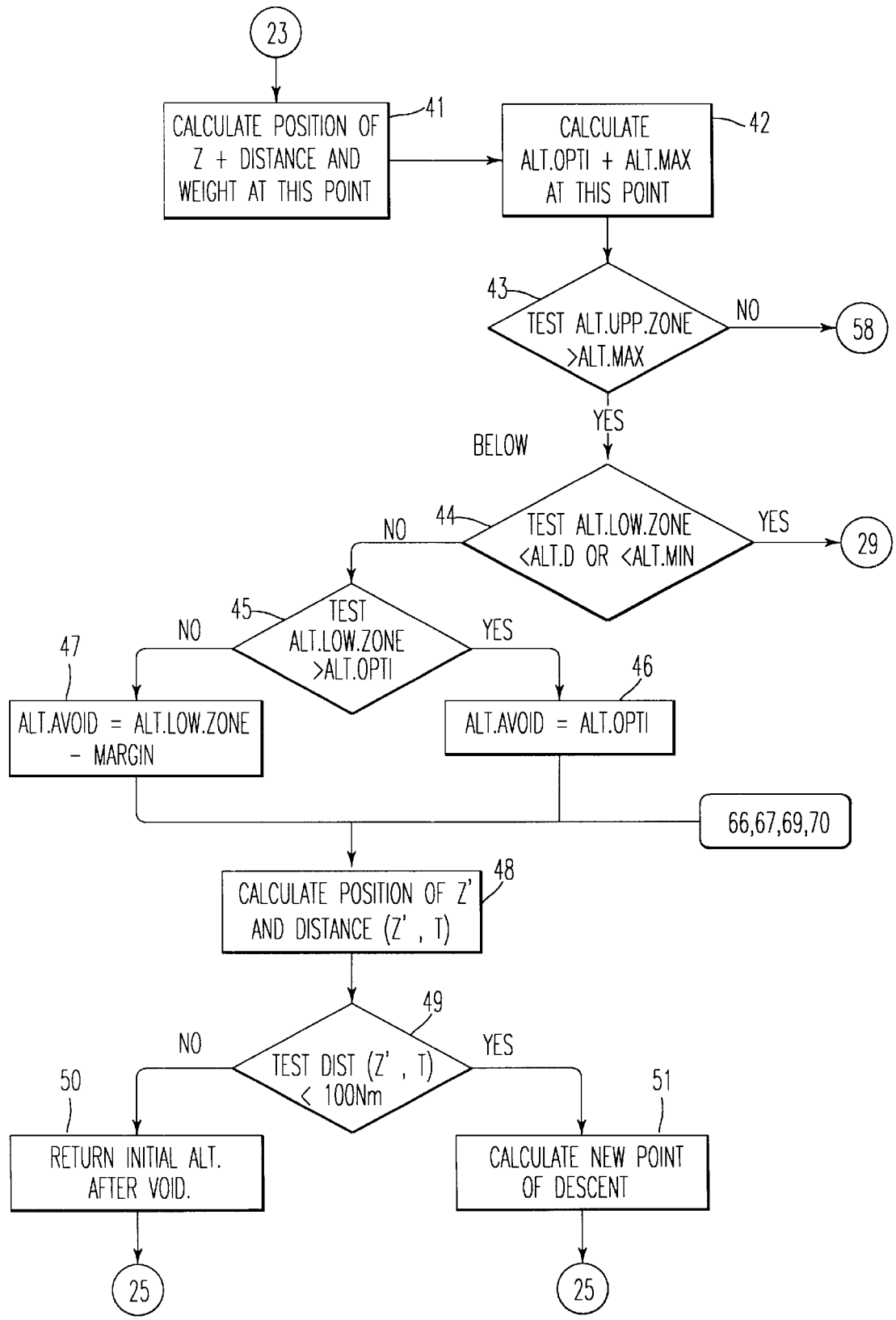
Figure 5B:
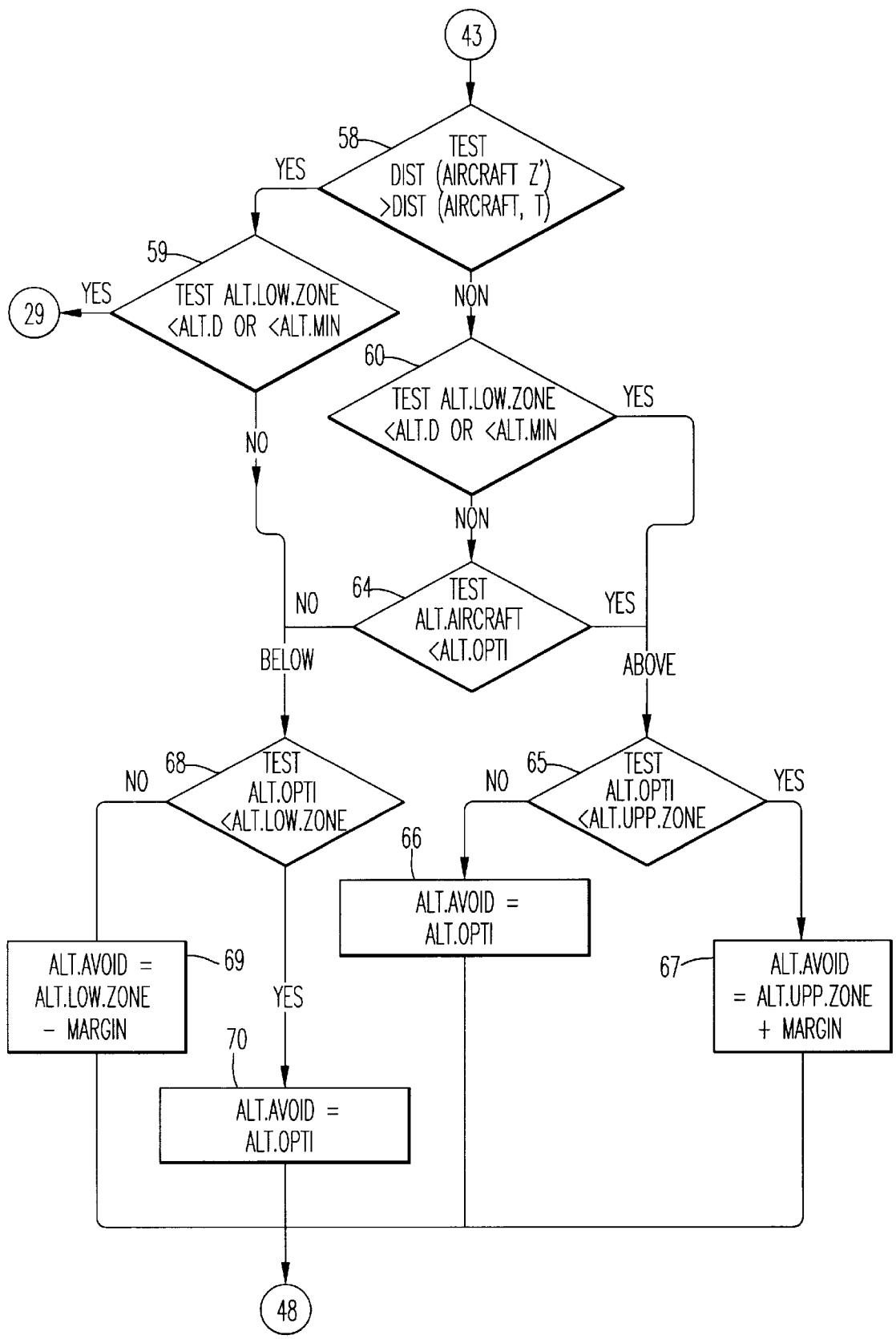

In step 24, the computer 4 triggers the determination of an avoidance trajectory. During this step, it therefore determines in particular the avoidance altitude, a computational algorithm example of which is represented in FIGS. 5a and 5b and the point of exit A1, B1 from the scheduled trajectory so as to reach the specified avoidance altitude (FIG. 3).

This point is calculated by taking account of the characteristics of the aerodyne, of the air regulations which define a maximum rate of climb or of descent, as well as of the discrepancy between the current altitude of the aerodyne 1 and the avoidance altitude to be reached.

In step 25, the computer 4 waits for the confirmation by the pilot of the new flight plan including the avoidance trajectory specified in step 24, doing so until the point of exit A1, B1 from the initially scheduled route 2 has been passed (step 26). While waiting, the computer 4 computes and displays the value of the distance of this point of exit A1, B1, having regard to the current position of the aerodyne 1, this value being periodically refreshed (step 27).

If, during this wait, the pilot has confirmed the new flight plan, the latter is sent to the automatic piloting device 14 in replacement for that route 2 initially scheduled, which then becomes active (step 28). The computer 4 then stands by again for new information in step 21.

If the pilot has not confirmed the new flight plan before crossing the point of exit A1, B1, in step 29 the computer 4 sends a message to the pilot to indicate that this point of exit A1, B1 has been passed and that avoidance of the zone is now impossible. Next, in step 30, it computes the distance between the current position of the aerodyne 1 and an entry point Z into the zone delimited by the cylindrical volume 10. So long as the aerodyne 1 has not reached entry point Z, this distance is displayed with periodic refreshing (step 31). After this entry point Z has been crossed, the computer 4 sends an alert message which signals to the pilot that the aerodyne 1 is in the meteorological zone (step 32). The computer 4 then waits for the zone delimited by the cylindrical volume 10 to be exited, having regard to the position of the point of exit Z' from this zone, and also to the current position and to the speed of the aerodyne 1 (step 33), before returning to step 21 for acquiring data, with erasure of the alert message.

In FIG. 5a, the determination of the avoidance altitude begins with the calculation of the position of the point of entry Z into the zone to be avoided, as well as of the distance separating this entry point Z from the current position of the aerodyne 1 and of the weight of the latter at this point, account being taken of the current weight and of the fuel consumption of the aerodyne 1 (step 41).

In step 42, the computer 4 determines the optimum (alt.opti) and maximum (alt.max) altitudes of the aerodyne 1 at the point Z, account being taken of the weight and performance of the aerodyne 1, as well as to the distance separating the aerodyne from this point Z. If the altitude of the upper limit of the zone to be avoided (alt.upp.zone) is not greater than the maximum altitude (alt.max) which the aerodyne 1 can reach at the entry point Z (step 43), the computer 4 goes to step 58 represented in FIG. 5b. Otherwise, upper avoidance (above the zone) is impossible and hence lower avoidance (below the zone) is compulsory, and the computer 4 goes to step 44 in FIG. 5a in which it checks whether the altitude (alt.low.zone) of the lower limit of the zone to be avoided satisfies conditions which depend on the original altitude given by the original flight plan and on the minimum permitted altitude (alt.min). This minimum altitude may either be of regulatory origin, such as the MEA (Minimum Enroute Altitude) and MORA (Minimum Offroute Altitude) altitudes, or be of operational origin (Minimum Operational Altitude which corresponds to the regulatory flight level above the FL195 level for example).

For example, the altitude of the lower limit of the zone must be greater than the minimum permitted altitude, and must be greater than a value (alt.D) obtained by subtracting a certain predetermined value from the initial altitude.

If the altitude of the lower limit of the zone does not satisfy these conditions, automatic avoidance of the zone is impossible and processing continues from step 29. Otherwise, the computer 4 checks in step 45 whether the altitude of the lower limit of the zone (alt.low.zone) is greater than the optimum altitude (alt.opti) calculated in step 42. If such is the case, the avoidance altitude to be met up with (alt.avoid) corresponds to the optimum altitude (step 46), and if not the avoidance altitude lies just below the zone, calculated with a certain safety margin (step 47).

The ensuing algorithm consists in determining the landing descent start point.

To do this, in step 48 the computer 4 determines the position of the point of exit Z' of the scheduled route 2 from the cylindrical volume 10, and the distance between this point and the scheduled point T of descent towards the runway. If this distance is greater than a threshold value, for example 100 nautical miles, it signifies that the aerodyne 1 can meet up with the point of descent T at the scheduled altitude (step 50). Otherwise, the aerodyne 1 should not meet up with this point of descent T, but will remain at the previously calculated avoidance altitude until it meets up with the descent trajectory 2' of the scheduled route. The computer 4 then determines the new point of descent T' or T'" which corresponds to the point at which the (lower or upper) avoidance trajectory at the avoidance altitude meets the initially scheduled descent trajectory 2' (step 51). On completing steps 50 and 51, execution continues via step 25.

If in step 43, the upper altitude (alt.upp.zone) of the zone is less than the maximum altitude (alt.max) calculated in step 42 which the aerodyne 1 can reach, in step 58 the computer 4 determines whether the scheduled point of descent T does or does not lie in the zone, by comparing the distances between the current position of the aerodyne 1 and the points Z' and T (FIG. 5*b*). If the point T lies inside the zone, upper avoidance is not possible and the computer 4 carries out a lower avoidance calculation by going to step 59 where it checks whether lower avoidance is possible. Otherwise, in step 60 the computer determines whether lower avoidance is possible by comparing the lower altitude (alt.low.zone) of the zone with the minimum permitted altitude (alt.min), as well as with the value (alt.D) (obtained by subtracting a certain predetermined value of the altitude given by the original flight plan). If lower avoidance is impossible, avoidance is performed by passing above the zone.

If avoidance is possible by flying above and below the zone, and if the current altitude (alt.aircraft) of the aerodyne 1 is less than the optimum altitude (alt.opti) (step 64), then upper avoidance is carried out, otherwise lower avoidance is carried out.

In step 59, upper avoidance is not possible and the computer examines whether lower avoidance is possible by comparing, as already described, the lower altitude (alt.low.zone) of the zone 10 with the minimum altitude values (alt.min and alt.D). If lower avoidance is impossible, processing continues from step 29.

In order to carry out an upper avoidance following steps 60 or 64, the computer 4 compares the optimum altitude (alt.opti) with the upper altitude (alt.upp.zone) of the zone (step 65). If the optimum altitude is greater than the upper altitude of the zone, the avoidance altitude (alt.avoid) corresponds to the optimum altitude (alt.opti) (step 66), otherwise, the avoidance altitude corresponds to the upper altitude (alt.upp.zone) of the zone with a safety margin (step 67). Execution of the algorithm continues via step 48 in order to determine the position of the point of descent T or T'" towards the runway.

Similarly, in order to carry out a lower avoidance following steps 59 or 64, the computer 4 examines whether the optimum altitude (alt.opti) is not less than the lower altitude (alt.low.zone) of the zone (step 68), the avoidance altitude (alt.avoid) corresponds to the lower altitude of the zone with a safety margin (step 69), otherwise it corresponds to the optimum altitude (step 70).

The computer then goes to step 48 described hereinabove in order to determine the point of descent T or T' towards the runway.

In practice, the altitude to be complied with by the aerodyne 1 is calculated in the form of a flight level, the flight levels being spaced apart by 100 feet (30.48 m). Thus, in step 42, the computer 4 also determines the optimum, respectively maximum, flight levels, by rounding the calculated altitudes to the nearest, respectively lower, flight level. In step 43, the upper altitude of the zone is in fact compared with the maximum flight level. In steps 44 and 60, the lower altitude of the zone is compared with the value (alt.D) obtained by subtracting the height of three flight levels, for example, from the initially scheduled flight level, as well as with the minimum flight level FL 195.

Likewise, the avoidance altitude is calculated in terms of flight level and the margin used in steps 47, 67 and 69 corresponds to a flight level.

What is claimed is:

1. Method for automatically controlling an aerodyne for vertical avoidance of a zone to be avoided with predefined geometrical contours, said aerodyne being equipped with an automatic piloting device, into which have been input a scheduled route and a vertical trajectory profile including a cruising flight altitude and a position of a point of descent towards a scheduled runway, said method comprising the following steps in succession:

acquiring limits of the zone to be avoided in a form of a horizontal contour with upper and lower altitudes, modelling of the zone to be avoided by a cylindrical volume delimited by the horizontal contour with the upper and lower altitudes, locating the cylindrical volume with respect to the scheduled route of the aerodyne so as to determine whether this route traverses the cylindrical volume, determining points of entry and of exit of the scheduled route in the cylindrical volume, if the scheduled route traverses the cylindrical volume, calculating optimum and maximum altitudes capable of being reached by the aerodyne, and current weight of the aerodyne when passing through the point of entry, account being taken of the current weight of the aerodyne and of consumption of fuel in order to reach this point of entry, calculating a new flight altitude for the vertical avoidance of the cylindrical volume, and of a point of change of altitude so as to reach an avoidance altitude, as a function of the lower and upper altitudes of the horizontal contour of the zone to be avoided, of current, maximum and optimum altitudes of the aerodyne, and of scheduled points of exit and of descent of the aerodyne, updating the current altitudes of the aerodyne, and inputting the point of change of altitude into the automatic piloting device.

2. Method according to claim 1, wherein:

avoidance of the zone occurs by flying below the cylindrical volume when the lower altitude of the horizontal contour of the zone is greater than a certain predetermined limit, and when the upper altitude of the horizontal contour of the zone lies above the maximum altitude capable of being reached by the aerodyne at the point of entry into the zone, or else when the scheduled point of descent lies in the cylindrical volume.

3. Method according to claim 2, wherein:

said avoidance altitude is preferably equal to the optimum altitude of the aerodyne at the point of entry.

4. Method according to claim 2, furthermore comprising the steps of:

periodically calculating and displaying a distance between a current position of the aerodyne and the point of exit from the scheduled route towards a selected avoidance trajectory, and activating a new route incorporating the selected avoidance trajectory being performed if the latter has been confirmed by an operator.

5. Method according to claim 2, in the case of an avoidance by flying below the zone to be avoided, and if the distance between the point of exit of the scheduled route from the cylindrical volume and the scheduled point of descent of the aerodyne is less than a predetermined threshold, furthermore comprising the step of:

calculating a new point of descent corresponding to a point at which a selected avoidance trajectory at the avoidance altitude meets an initially scheduled descent trajectory.

6. Method according to claim 2, if avoidance of the zone to be avoided is possible by flying above and below, furthermore comprising the step of:

selecting an avoidance trajectory situated with respect to the aerodyne in a direction of the optimum altitude.

7. Method according to claim 1, wherein:

said avoidance altitude is preferably equal to the optimum altitude of the aerodyne at the point of entry.

8. Method according to claim 7, furthermore comprising the steps of:

periodically calculating and displaying a distance between a current position of the aerodyne and the point of exit from the scheduled route towards a selected avoidance trajectory, and activating a new route incorporating the selected avoidance trajectory being performed if the latter has been confirmed by an operator.

9. Method according to claim 3, in the case of an avoidance by flying below the zone to be avoided, and if the distance between the point of exit of the scheduled route from the cylindrical volume and the scheduled point of descent of the aerodyne is less than a predetermined threshold, furthermore comprising the step of:

calculating a new point of descent corresponding to a point at which a selected avoidance trajectory at the avoidance altitude meets an initially scheduled descent trajectory.

10. Method according to claim 7, if avoidance of the zone to be avoided is possible by flying above and below, furthermore comprising the step of:

selecting an avoidance trajectory situated with respect to the aerodyne in a direction of the optimum altitude.

11. Method according to claim 1, furthermore comprising the steps of:

periodically calculating and displaying a distance between a current position of the aerodyne and the point of exit from the scheduled route towards a selected avoidance trajectory, and activating a new route incorporating the selected avoidance trajectory being performed if the latter has been confirmed by an operator.

12. Method according to claim 11, furthermore comprising the steps of:

periodically calculating and displaying the distance between the current position of the aerodyne and the zone to be avoided, if the point of exit has been passed without the new route having been confirmed, and displaying a warning message when the aerodyne enters the zone to be avoided.

13. Method according to claim 12, in the case of an avoidance by flying below the zone to be avoided, and if the distance between the point of exit of the scheduled route from the cylindrical volume and the scheduled point of descent of the aerodyne is less than a predetermined threshold, furthermore comprising the step of:

calculating a new point of descent corresponding to a point at which the selected avoidance trajectory at the avoidance altitude meets an initially scheduled descent trajectory.

14. Method according to claim 12, if avoidance of the zone to be avoided is possible by flying above and below, furthermore comprising the step of:

preliminarily selecting the avoidance trajectory situated with respect to the aerodyne in a direction of the optimum altitude.

15. Method according to claim 11, in the case of an avoidance by flying below the zone to be avoided, and if the distance between the point of exit of the scheduled route from the cylindrical volume and the scheduled point of descent of the aerodyne is less than a predetermined threshold, furthermore comprising the step of:

calculating a new point of descent corresponding to a point at which the selected avoidance trajectory at the avoidance altitude meets an initially scheduled descent trajectory.

16. Method according to claim 11, if avoidance of the zone to be avoided is possible by flying above and below, furthermore comprising the step of:

preliminarily selecting the avoidance trajectory situated with respect to the aerodyne in a direction of optimum altitude.

17. Method according to claim 1, in the case of an avoidance by flying below the zone to be avoided, and if the distance between the point of exit of the scheduled route from the cylindrical volume and the scheduled point of descent of the aerodyne is less than a predetermined threshold, furthermore comprising the step of:

calculating a new point of descent corresponding to a point at which a selected avoidance trajectory at the avoidance altitude meets an initially scheduled descent trajectory.

18. Method according to claim 17, if avoidance of the zone to be avoided is possible by flying above and below, furthermore comprising the step of:

selecting the avoidance trajectory situated with respect to the aerodyne in a direction of the optimum altitude.

19. Method according to claim 1, if avoidance of the zone to be avoided is possible by flying above and below, furthermore comprising the step of:

selecting an avoidance trajectory situated with respect to the aerodyne in a direction of the optimum altitude.

20. Method according to claim 1, wherein:

said zone to be avoided is a dangerous meteorological zone, especially one of clear air turbulence and/or icing.

* * * * *